3 Sheets—Sheet 3.
M. A. & L. A. MELCHER.
PATTERN-CHARTS FOR DRAFTING GARMENTS.
No. 169,564. Patented Nov. 2, 1875.
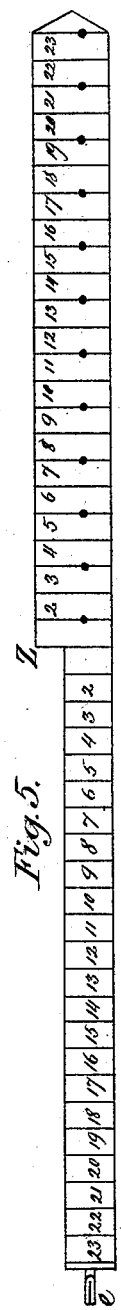
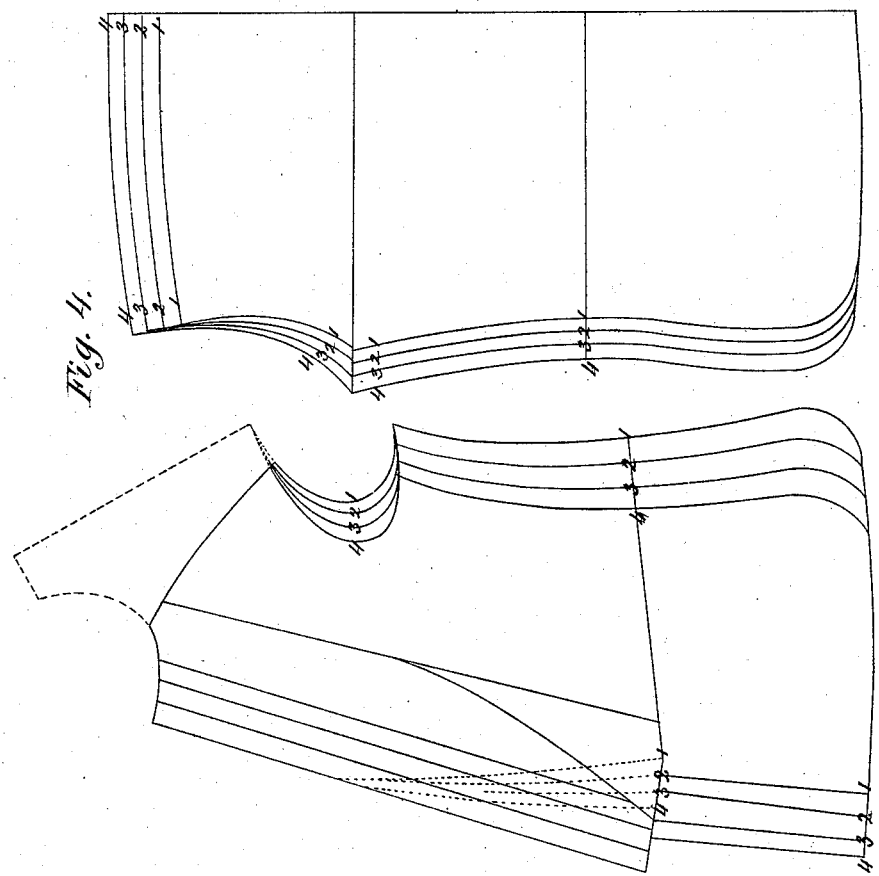
Witnesses:
J. Wes. Wagner
J. A. Rutherford
Inventors:
Michael A. Melcher
Lewis A. Melcher
By Johnson and Johnson
his Attys

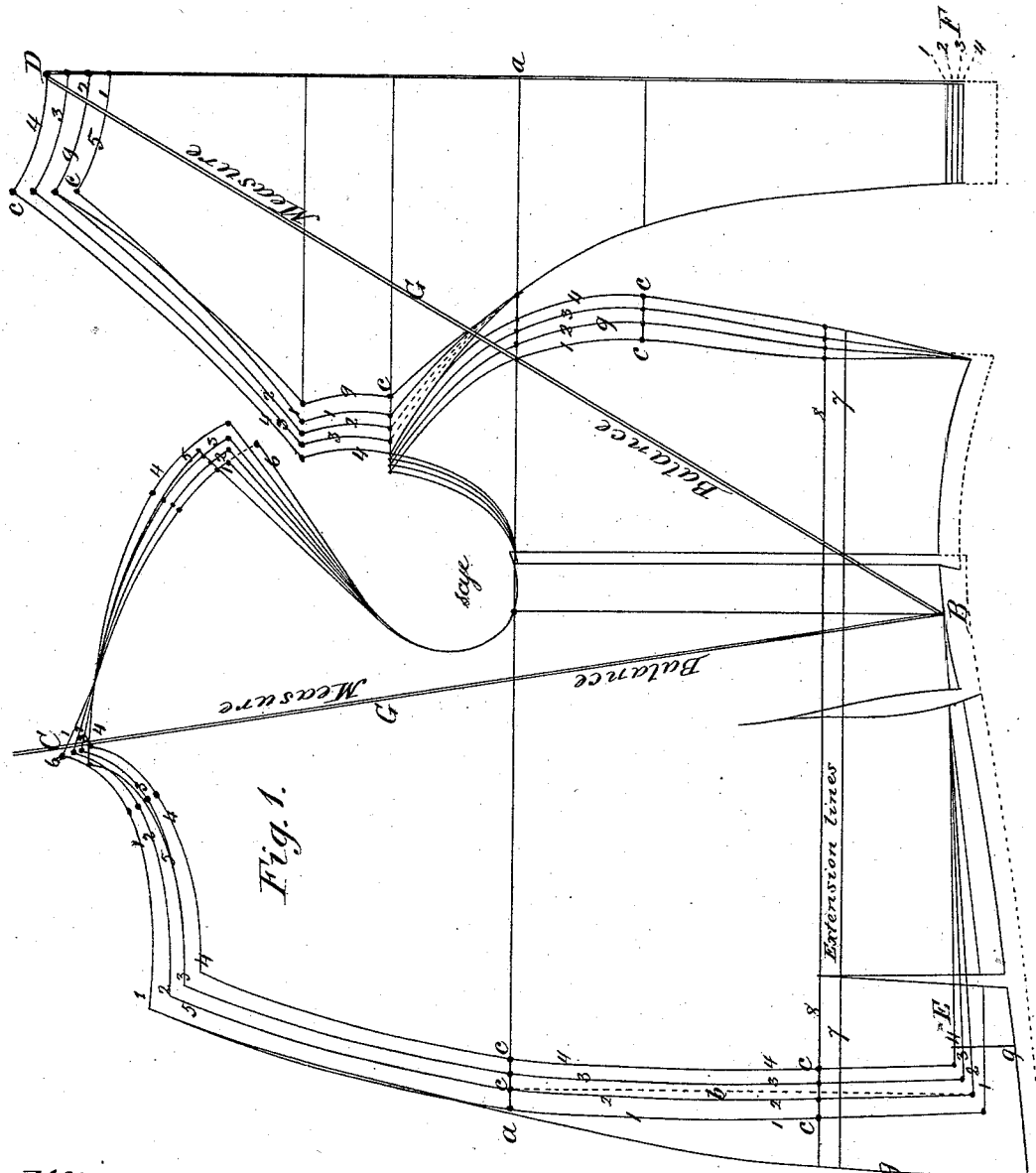

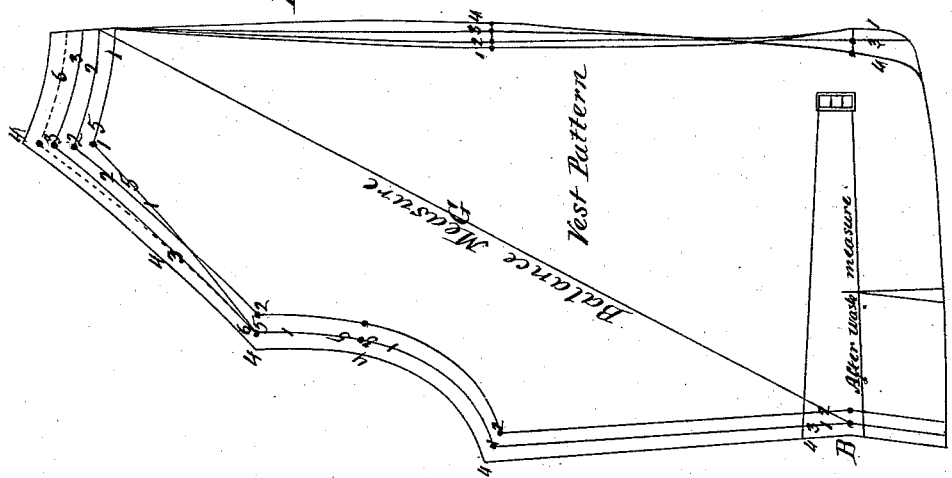

UNITED STATES PATENT OFFICE.

MICHAEL A. MELCHER AND LEWIS A. MELCHER, OF CONSTANTINE, MICH.

IMPROVEMENT IN PATTERN-CHARTS FOR DRAFTING GARMENTS.

Specification forming part of Letters Patent No. 169,564, dated November 2, 1875; application filed August 7, 1875.

*To all whom it may concern:*

Be it known that we, MICHAEL A. MELCHER and LEWIS A. MELCHER, of Constantine, in the county of St. Joseph and State of Michigan, have invented certain new and useful Improvements in Combination - Patterns for Cutting Out Garments; and we do hereby declare that the following is a full, clear, and exact description thereof, which will enable others skilled in the art to which it pertains to make and use the same, reference being had to the accompanying drawing, and to the letters of reference marked thereon, which form a part of this specification.

As now practiced, the plans for cutting garments are troublesome and necessarily slow, and more or less difficult to adapt to the changing fashions and more difficult forms of men.

Our object is to furnish fitting or foundation patterns, which will be adapted for different forms of men, by the combination of different forms of patterns for all sizes, forms, and shapes of men and boys, and in which each pattern is so designed as to fit every form measuring the same breast-measure, so that a cutter, with a little practice, will be enabled, with a set of our new patterns, to fit the worst forms of men without much compensating and composing.

Most rules and patterns now used, are given on the basis of measurements of straight and well-built men, and any variations from them are mainly left to the cutter's measure and judgment. But there are very few cutters able to take measures with mathematical exactness, as all points, by the old rules, could not be reached without one measure conflicting with the other.

Our patterns are dependent on but a few measures—that is to say, first, the breast-measure, taken with an inch-tape; then the measure around the body under the arm and over the vest; second, the waist - measure. One-fourth of this measure will give the base-point B, in the drawings of the balance-measure G, above the hip - bone, as indicated by our patterns. These measures are easily taken and not dependent upon the judgment. The breast-measure thus obtained will give the size of the person and determine the pattern to be used in any particular case. If the balance-measure G indicates a difference of two inches more from C to B than from D to B, then that determines the use of the pattern 1 for a full-breasted man. But if the two balance-measures of the patterns are alike, then that gives the inclined form, and we use pattern 3, as given in the patterns.

Our patterns give a natural foundation, and will not differ by using the right-sized pattern from the breast-measure and the pattern indicated by the balance-measure—we say, not differ more than $3+3=6$, and always will be 6, and, therefore, no compensating, or composing, of rules, and the exercise of judgment will be required. To illustrate this more clearly, we refer to the patterns where two are grouped together. The lines across from back to front show two patterns of one and the same breast-measure. But it will be noticed that the difference in width of one pattern from the arm to the breast is compensated by said pattern being just that much smaller behind; and the balance - measures show their conformity with the rule stated, and how the balance-measure point B is located.

By our patterns, the tailor has the advantage of seeing how alterations from a pattern for a well-built man have to be made. Many tailors have no idea how alterations for different forms are effected, and by their measures are often misguided, so as to lose sight of the whole form, and then depend on trying on the coat, and lose much time by altering, and, even then, often fail to get a proper fit of the garment.

In cutting store-coats our combined patterns are of special advantage; for, in cities, about four-tenths of the men are inclined forward, while in the country about eight-tenths are of forward bend, and more than one half of these latter are round-shouldered, and, therefore, always find clothing too small and ill-shaped, as most shop-work is made for full-breasted men.

By our patterns, this difficulty is overcome and coats cut to suit different forms. By having the advantage of the patterns grouped together, a tailor will soon acquire a knowledge that will enable him to tell, by looking at a man, to what class he belongs, and which pattern to use by simply taking the breast-measure; for, having nine patterns before him, and having to fit a round-shouldered man, he is enabled to see the right pattern at once. In this way our patterns save much time.

The patterns are on stiff paper-board and always ready for use upon the cloth by means of the holes; and the variation in style and taste easily added. Their use will effect the saving of about one-quarter of a yard of cloth for every coat and vest cut over the old plan of marking on the cloth without pattern.

By our combined patterns, a tailor need not keep on hand so many patterns, as is often done by keeping a separate pattern for each customer, as it is only necessary to write the name of the customer and the number of his pattern upon the back of the pattern, so that the tailor always has his pattern for subsequent orders.

We furnish our patterns in whatever sizes required, but each pattern may contain different sizes.

We use a waist-strap with our patterns, in which the center of the back is marked so as to measure to point B, and from it one-quarter of the waist-measure, which place can be marked again, to take the balance-measure from. This strip has a hook and eyelet-holes in front and numbers on each side from the center and back, and the numbers are so arranged that when the strap is applied and hooked into one of the holes the two sets of the numbers will be seen. The two numbers meeting in front, when hooked, will show the center in front, and half of that number will give the point B for the balance-measure. For the length from the scye to B, we use a straight-edge under the arm, hanging the hook on and measuring to B.

Our patterns are equally adapted for cutting shirts.

We employ a group of nine patterns to serve nine or more patterns of one size round the breast; so that, having taken the breast-measure, length of back from collar-bone to the waist, and the balance-measures, the cutter is enabled to choose the right pattern for a fitting-garment by means of their numbers. The use of delineators to obtain different sizes of patterns is not new; and the rules we employ for determining any specific pattern have been employed in garment-cutting measures; but the combination of these things to constitute nine groups of patterns for cutting coats and vests for nine different forms of men is of great advantage and importance in taking a quick and correct measure. The pattern for each form is readily found by their numbers, and these are determined from the fixed lines known as the hollow of the scye and balance-measure shown in the different diagrams of the coat and vest patterns of the accompanying drawings, and in which—

Figure 1 is the coat; Figs. 2 and 3, the vest; Fig. 4, the shirt-patterns, and Fig. 5 the waist tape-measure.

The nine different grouped patterns are indicated by the numbers 1, 2, 3, 4, 5, 6, 7, 8, and 9 on the diagrams, and they apply to every pattern alike, working on the shoulder system. They are indicated at different points of each pattern, so that each separate pattern can be readily traced by its number.

The measures necessary by these patterns for custom-coat are as follows: 1 indicates the breast-measure over the breast for a very erect and full-breasted man; 2, for a straight normal-built man, and gives the waist-measure by strap laid round the hollows on waist above the hips, and of which one-quarter will give the point B, and thereby determine the location of the balance-measures G, as shown on the patterns, allowing one quarter of waist from B to E, and one inch more, any greater width of breast being taken out, as indicated by the dotted line b, from the scye hollow line to the bottom line E; 3, from D to F for a forward-inclining man; 4, for a very round-shouldered man the balance-measure from B to C, and B to D. This balance-measure will show the cutter which pattern to use.

Pattern 1, for a full-breasted man, will measure from B to C two inches more than from B to D. Pattern 2, for a well-proportioned man, will measure from B to C one inch more than from B to D. Pattern 3, for an inclined man, will measure both balance-measures alike. Pattern 4, for a round-shouldered man, will measure from B to C one inch less than from B to D. Pattern 5, for a high-shouldered man, will measure from D to a half-inch less than from F to a. Pattern 6, for a low-shouldered man, will measure from D to a half an inch more than from F to a. In pattern 7, for a short and thick man, the shoulders may belong to any of the foregoing numbers, and the pattern is only to be shortened in length from 7 to 8, as shown on pattern, by moving the extension-line. Pattern 8 is for a tall and slender figure, by extending the line from 8 to 7 the required distance. In pattern 9, for a corpulent man, the shoulders may also belong to any of the foregoing numbers, and the back will have to be so much smaller as the breast has to be wider from 2 to a, or from 4 to a, on the breast, according to the shoulder.

Indicators or small holes c are made along the several lines, and at the angles or corners, whereby to trace each measure, commencing on the back the straight line by 1, and marking through the holes, so that the lines can be finished when the pattern is removed. Various guides of charts and rules for drafting patterns for cutting garments are provided, in which lettered spaces and lines have been arranged for use with separate and distinct patterns, to ascertain any particular measure.

We have described and shown nine patterns as composing the group and completing our designs; but for all practicable purposes all these sizes are not necessary, as six will be found ample, with the skill of the cutter, to give any measure desired.

For cutting shirts the same rules and patterns are used, and the drawings, Fig. 4, show the same group of patterns.

The waist-strap is shown in Fig. 5, in which one part of its length is wider than the other to receive a line of holes and a line of numbers, while the other part has a line of numbers corresponding with the first line, and both lines running from the middle of the length, which is the center Z of the back, to the opposite ends of the strap, but not in the same straight line. In measuring the waist the hook $e$ is hooked into the proper hole, and the two numbers meeting in front will be the center, and half of that measure will give the point B, so that this numbered and perforated strap is an auxiliary to our combined patterns and the measures for giving the base point of the balance-measures.

We claim—

1. The pattern-chart for drafting garments, herein described, provided with the scales 1 to 9 or more, inclusive, arranged as shown and described, and for the purpose herein set forth.

2. The waist-strap, with its double numbers and line of holes, arranged as shown and described, adapted for use with the combined patterns, as herein described.

In testimony that we claim the foregoing we have affixed our signatures in presence of two witnesses.

MICHAEL A. MELCHER.
LEWIS A. MELCHER.

Witnesses:
F. I. MORSE,
P. HASLET.